(12) United States Patent
Asadorian et al.

(10) Patent No.: US 11,681,948 B2
(45) Date of Patent: Jun. 20, 2023

(54) MESSAGE OBJECTION IDENTIFICATION AND HANDLING

(71) Applicant: salesforce.com, inc., San Francisco, CA (US)

(72) Inventors: Narek Asadorian, San Francisco, CA (US); Bradford Powley, Palo Alto, CA (US)

(73) Assignee: Salesforce, Inc., San Francisco, CA (US)

( * ) Notice: Subject to any disclaimer, the term of this patent is extended or adjusted under 35 U.S.C. 154(b) by 426 days.

(21) Appl. No.: 16/777,693

(22) Filed: Jan. 30, 2020

(65) Prior Publication Data

US 2021/0241162 A1    Aug. 5, 2021

(51) Int. Cl.
*H04L 51/216* (2022.01)
*G06N 20/00* (2019.01)
*G06N 5/04* (2023.01)
*G06F 16/28* (2019.01)

(52) U.S. Cl.
CPC ........... *G06N 20/00* (2019.01); *G06F 16/285* (2019.01); *G06N 5/04* (2013.01); *H04L 51/216* (2022.05)

(58) Field of Classification Search
CPC .............................. G06F 16/285; H04L 51/216
See application file for complete search history.

(56) References Cited

U.S. PATENT DOCUMENTS

| | | | |
|---|---|---|---|
| 2019/0140995 A1* | 5/2019 | Roller | G06F 40/295 |
| 2019/0386949 A1* | 12/2019 | Vennam | G06F 40/205 |
| 2020/0153878 A1* | 5/2020 | Chauhan | G06F 3/0483 |

\* cited by examiner

*Primary Examiner* — Esther B. Henderson
(74) *Attorney, Agent, or Firm* — Holland & Hart LLP

(57) ABSTRACT

The system described herein may utilize a data stream connection to detect that a new message is transmitted between users. The system may perform various pre-processing techniques on the new message to identify that the new message is an objection message candidate. The system may retrieve one or parent messages of the new message. The new message and the parent messages may be input into a model trained to classify objection messages. The model may identify that the new message is classified as an objection message based at least in part on processing the new message and the parent messages. An objection classification identifier may be stored in association with the new message based at least in part on the result of the processing by the model.

22 Claims, 11 Drawing Sheets

MESSAGE OBJECTION IDENTIFICATION AND HANDLING

FIELD OF TECHNOLOGY

The present disclosure relates generally to database systems and data processing, and more specifically to message objection identification and handling.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales. The cloud platform may support communication services or applications. In some examples, the cloud platform may process communications to support communication analytics and automated actions.

DETAILED DESCRIPTION

Figure 1:
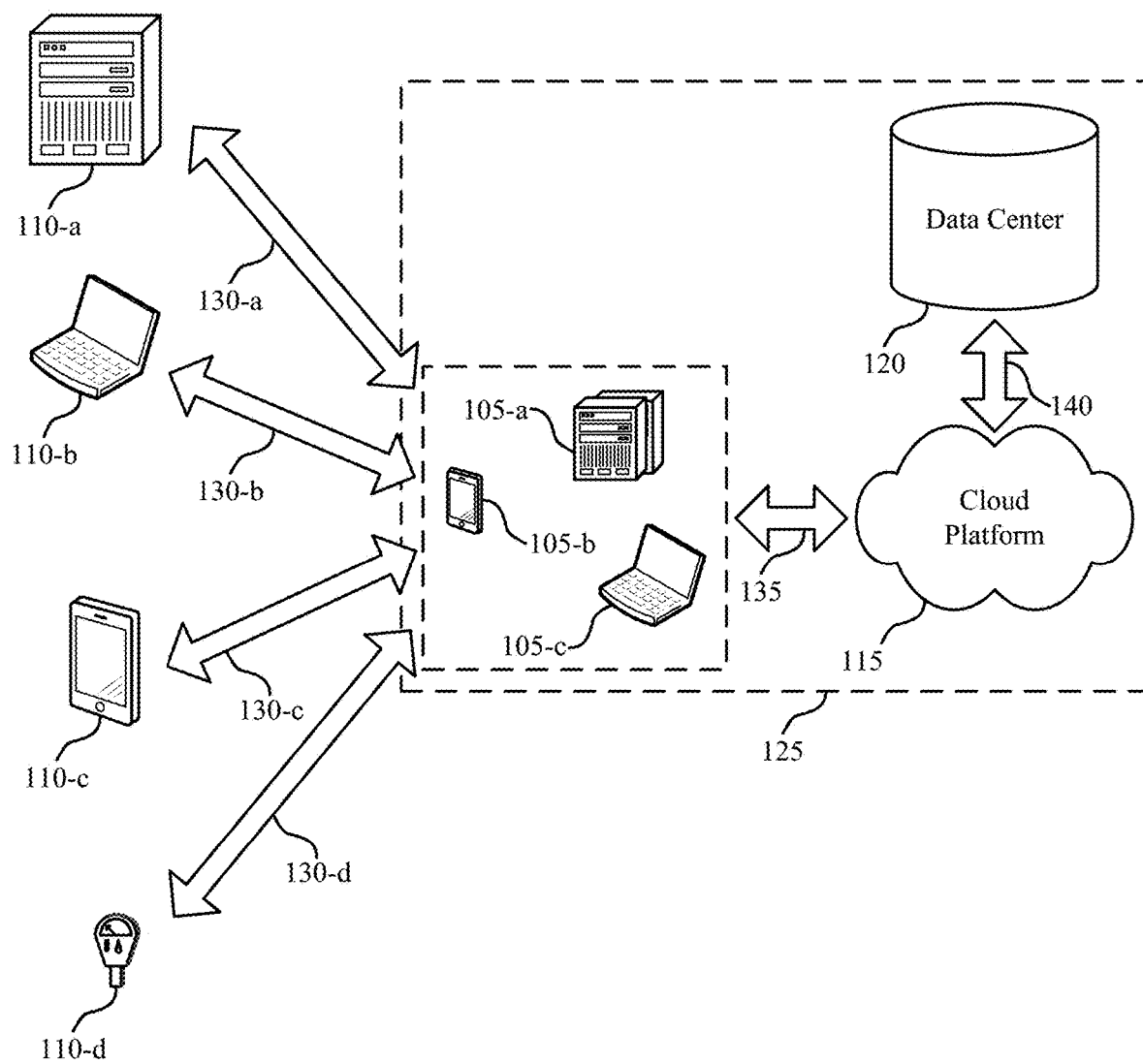
FIG. 1 illustrates an example of a system for data processing that supports message objection identification and handling in accordance with aspects of the present disclosure.

Aspects of the disclosure described herein may provide an automated communication ingestion and monitoring service to support action identification for a user. The system may manage layered threads of communications (e.g., emails, texts, phone call transcripts, chat transcripts) between various users of the system and contacts external to the system. The system may analyze new messages and context(s) associated with a new message to determine whether the new message corresponds to an objection. An objection message may be an example of a message that denies or rejects a request or offer and may correspond to one or more of plurality of objection message categories. Objection messages may be identified using various pre-processing and machine learning techniques.

The system described herein may utilize a data stream connection to detect that a new message (e.g., email) is transmitted between users. The system may perform various pre-processing techniques on the new message. The pre-processing techniques may be used to reduce the amount of messages that are analyzed using a machine learning model, which may improve processing efficiencies, among other benefits. In accordance with the pre-processing techniques, the new message may be identified as an objection message candidate. When an objection candidate is identified, the system may retrieve one or parent messages of the new message. A parent message may correspond to one or more immediately prior messages in a thread of messages that is maintained in association with the users. The parent message may provide more context such as to more accurately classify potential objection messages.

The model may be trained on corpus of message thread data such that the model is configured to identify objection messages and categories of objection messages. Categories of objection messages may include authority, need, timing, not interested, and do not contact. In some examples, objections messages may be classified in more than one category. The model may output confidence scores associated with each of or a subset of the various categories. The system may identify or perform one or more actions associated with the categories identified for a new message. Thus, the described techniques provide a model that is uniquely trained to identify objection messages based on contextual information associated with the message to support a resource efficient process for managing communications.

Aspects of the disclosure are initially described in the context of an environment supporting an on-demand database service. Aspects of the disclosure are further described with respect to a computing system that illustrates implementation of objection identification and handling, a model training system for training a machine learning model to identify objections, and a process flow diagram. Aspects of the disclosure are further illustrated by and described with reference to apparatus diagrams, system diagrams, and flowcharts that relate to message objection identification and handling.

FIG. 1 illustrates an example of a system 100 for cloud computing that supports message objection identification and handling in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

The cloud platform 115 may support or have access to various communication systems. For example, the cloud platform 115 may access or support an email server, a chat service, a phone system, a message system, etc. In some examples, the cloud platform 115 provides an email server and accesses other communication services, such as a phone system, message system (e.g., a client device supported messaging system), a social media platform, and/or other communications systems. In some examples, the cloud platform 115 access the various systems using application programming interfaces (APIs) or other connections, such as a data streaming connection. In some examples, the communication system supported by the cloud platform 115 may batch request communication data from various sources, combine the batch data with other data (such as streaming connection data), and organize/monitor the data to provide various services. The cloud platform may also support an objection message classifier, which analyzes messages of one or more of the described systems, identifies objection messages, and may identify one or more actions for a user based on identification of the objection messages.

Some communications systems are siloed, in that each form of communication is supported by a separate system. These separate systems may not be accessible to external systems. These siloed systems may also prevent or hinder a complete analysis of communications by a user, which may result in an inaccurate communication analysis. Further, some communications systems may provide automated analysis of a communication to provide recommendations, but these recommendations are based on a single communication (e.g., one email), and thus may not provide an accurate status update. Further, these communications systems may analyze each email. In high communication volume scenarios, the analysis of every email require significant processing, memory, and other computing resources.

Aspects of the communication system supported by the cloud platform 115 described herein may access various communications by various users of the cloud platform 115 as well as users external to the cloud platform 115. The system may maintain detailed and multi-layered threads of communications, such as email communications. The threads may be maintained with reference to one or more users to a communication, such that any a thread may be retrieved with reference to one or more of the users. The system may also automatically identify and classify objection messages and identify or perform actions based on objection message classifications. For example, when a new message is detected (e.g., using a streaming connection), the system may perform pre-processing techniques to determine whether the new message is an objection candidate, which may increase processing efficiencies relative to other systems by reducing the number of messages that are processed by a compute-intensive machine learning model. If the message is determined to be an objection message candidate, the system may retrieve or access a thread associated with the message and analyze the message and one or more parent messages in the thread to determine whether the new message is an objection message. Utilization of the parent message may provide greater context to the objection message determination, which results in more accurate classifications.

It should be appreciated by a person skilled in the art that one or more aspects of the disclosure may be implemented in a system 100 to additionally or alternatively solve other problems than those described above. Further, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

A salesperson may utilize a CRM system supported by the cloud platform 115 to support a high-velocity (e.g., high volume) sales. The salesperson may communicate with various customers and prospective customers (e.g., a contact 110) using emails, which may be automatically distributed by aspects of the cloud platform 115. In some cases, a contact 110 may reply to the email with a message such as "we cannot justify the spend" or "I'm not the right person for this." The objection message classifier supported by the cloud platform 115 as described herein may classify the message as an objection (e.g., a budget objection message or an authority objection message), identify one or more actions, and indicate the objection message classification and the action to the salesperson. In some examples, the system may automatically perform an action based on the objection classification.

Figure 2:
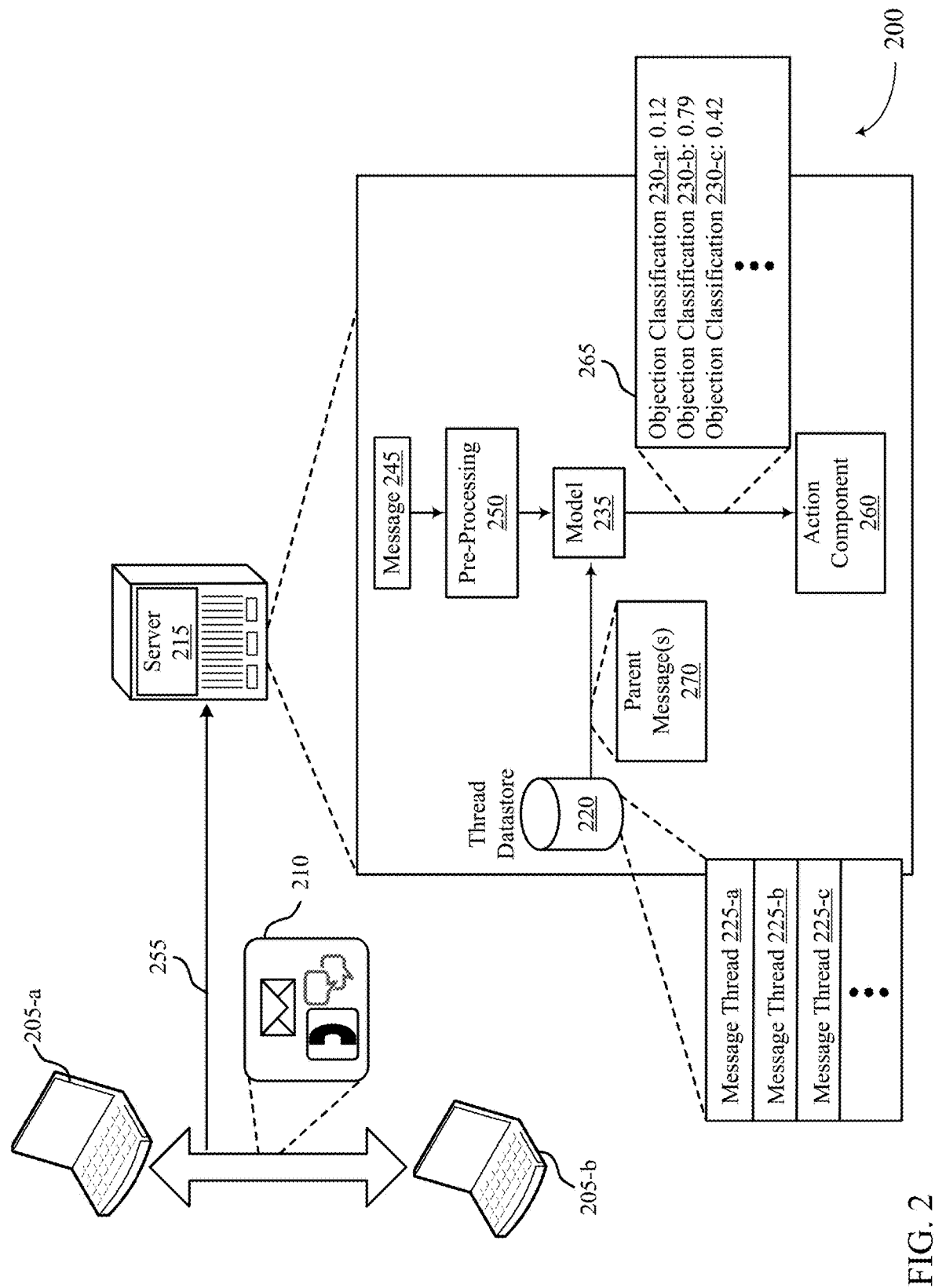
FIG. 2 illustrates an example of a system that supports message objection identification and handling in accordance with aspects of the present disclosure.

FIG. 2 illustrates an example of a system 200 that supports message objection identification and handling in accordance with aspects of the present disclosure. The system 200 includes user devices 205 and a server 215. The user devices 205 may be examples of devices used by cloud clients 105 and/or contacts 110 as described with respect to FIG. 1. For example, a cloud client 105 may be associated with user device 205-a and a contact 110 may be associated with a device 205-b. The server 215 may represent various aspects of the cloud platform 115 and/or data center 120 of FIG. 1, and may comprise one or more computing systems, which may be logically or physically distributed.

The server 215 may monitor and process communications 210 between user devices 205, other user devices, etc. In some cases, the server 215 may support or access an email server that supports email communication by one or both of the devices 205. For example, the server 215 may maintain a streaming connection 255 with an email server that supports the communication by one or both of the user devices 205. The server 215 may be configured with connections to other communication systems. For example, the server 215 may access chat application(s), social media application(s), telephonic systems, etc. associated with users of one or more of the user devices 205. In some examples, the server 215 may access such systems using streaming connections, APIs, etc.

The server 215 and/or associated systems may maintain a thread datastore 220, which stores a plurality of message threads 225 and thread states 230 associated with respective message threads 225. As noted herein, the message threads 225 may be stored using a complex and layered technique, such that a message thread associated with two or more users may be efficiently stored and retrieved. A message thread 225 may include a plurality of communications between users to a thread. In some examples, a message thread 225 may be associated with one particular type of communication 210, such as email. In other cases, a message thread 225 may include a plurality of communication types, such as emails, phone calls, chat service/application communications, text messages, and the like. In the case of the phone call, a system associated with or supporting a phone system may transcribe communications between various users of the system, such that the communication 210 may be stored in a message thread 225 and/or processed by associated systems, such as the objection message classification system described herein.

The server 215 may detect a new message 245 using connection 255, which may be an example of a data stream connection. The message 245 may be pre-processed by pre-processing component 250, which applies various heuristics to the message 245 to determine whether the message 245 qualifies as an objection candidate. The pre-processing may function to reduce the amount of messages processed by a resource intensive machine learning model 235 as well as to reduce the number of false positives. One pre-processing rule determines whether the message is composed or well-behaved. In accordance with another pre-processing rule, the pre-processing component 250 determines whether the message is an inbound message from an external source. That is, the system may not concern itself with processing message transmitted within an organization. Pre-processing may also include determining whether the message 245 includes one or more of a pre-defined list of strings. The pre-defined list of strings may be determined based on a corpus of communication data that includes examples of objection messages. Common words, phrases, etc. and their variants from objections messages may be used to populate the pre-defined list of strings. If the message 245 "passes" or satisfies the rules, then the message 245 may be identified as an objection candidate, which means that the message 245 may be input into the model along with some contextual information to provide accurate objection classification(s).

The server 215 may identify and access a thread associated with the message 245 based at least in part on identifiers associated with participants to the message. As discussed above, the thread may include past messages communicated between the users (as well as other users). The server 215 may retrieve one or more parent messages 270 (e.g., prior or immediately prior messages) from the accessed thread in response to determining that the new message 245 is an objection message candidate. The parent messages 270 may function to add additional context to the message 245 such that the model 235 may make a more accurate objection message classification determination. For example, a message that says "no thanks" may be classified as an objection message without context. However, if the prior message is a question such as "do you need any additional information?", then the message is not an objection (e.g., a denial of an offer). Conversely, if the prior message is "We have an exciting offer for you . . . product x is discounted by 25% . . . ," then the "no thanks" message may be classified as an objection. Accordingly, the parent messages 270 may be used, in conjunction with the message 245, by the model 235 to determine that the new message 245 is an objection.

The model 235 may featurize the message 245 and the one or more parent messages 270 to classify the message 245 as an objection message. The one or more parent messages 270 may provide a more accurate objection classification since the new message 245 may be transmitted in response to the parent message 270, which may be an example of an offer or other classification. More particularly, the model 235 may be a multi-input model that takes the message 245 and at least one parent message 270 as the inputs. The model 235 may be an example of a natural language processing (NLP) model, which receives the message 245 and the parent message 270 as a strings and tokenizes the messages separately or together. In some examples, a tokenizer may tokenize the message before the tokenized messages are processed by the model 235.

Because the model 235 may output scores associated with multiple labels/classifications, the model 235 may be referred to as a multi-label model 235. The model 235 may be an example of a deep learning model 235 that has a plurality of graph nodes and performs a series of linear and non-linear transformations on the input data (e.g., the tokenized messages). The final output may be generated in accordance with a number of linear transformations, where each linear transformation is input into a soft-max function that maps the output to a value between 0 and 1 (e.g., a confidence score). The number of linear transformations may correspond to the number of categories of objection messages configured or trained for the system. In one particular example, the number of categories is six, and the model 235 performs six linear transformations and six corresponding soft-max functions to output six values between 0 and 1 corresponding to the six categories. In some examples, the model 235 may perform some threshold analysis to determine whether the value is above a particular threshold to qualify for a certain objection category classifications 230. The model 235 may utilize logistic regression techniques, or the like.

The output 265 (e.g., the objection classifications 230 and corresponding confidence scores) stored in association with the threads in the thread datastore 220 or another storage location. In some examples, the output 265 may be processed by an action component 260, which represents logic for surfacing aspects of the output and/or actions. The action component 260 may be configured or customized for various different circumstances and/or organizations (e.g., cloud clients 105). In one example, a "do not contact" objection may supersede other types of objections and thus may be surfaced to a user. In some cases, the action component 260 may represent an application layer that processes the output 265 and determines actions, indications (e.g., surfacing output), or a combination thereof. For example, an email application may notify a user when the objection corresponds to a budget objection, a do not contact objection, etc.

Further, actions may be linked to type objections that are determined. As such, objection classification may be linked to a different action or action type. In one example, the action component 260 may set automatic reminders for a user based on the objection classification, and the reminders may indicate to perform a follow-up call or email. The system may also automatically generate and/or send emails based on the objection classification(s). For example, in the case of a do not contact objection, the action component 260 may automatically generate and send a confirmation email that the user/organization will not contact the user again. In such cases, the corresponding email address may be removed from a subscriber list. The actions may also use information included in the message 245 to determine some aspect of the action. For example, if the message 245 is classified as a timing objection, the message 245 may include some indication of availability. A reminder may be automatically be set based on the availability indication.

In some examples, objection classifications include (1) do not contact, (2) not interested, (3) timing, (4) need, (5) authority, and (6) budget. A budget objection may indicate that a person is not willing to purchase a product or service either due to a lack of current budget/funds or because the price is too high. In some cases, a budget objection may leave open the possibility of negotiations, and actions may be formulated accordingly. The following may be considered positive examples of budget objections:
    <product> is out of our price range
    we cannot justify the spend
    <product> is too expensive
    the price per user is too much
    the return isn't worth the price
    we won't have budget until FY2020
    we aren't interested unless you are willing to be flexible on the price The following may be considered negative examples of budget objections:
    we have the budget, the timing just isn't right
    when we get together, let's talk turkey
    we will want to see a demo before we commit any funds An authority objection may indicate that the person is not the correct one for a particular sales engagement (e.g., their role has changes, they are not the decision maker or influencer, they are not the one to influence the sales from the inside). However they person may open the door for the person that is the correct contact. The following may be positive examples of authority objections:
    your product would be a better fit for our other business unit
    <person> is the correct person to contact
    my boss is not interested
    I'm not the right person for this
    our leadership decided on another service (also an example of a need objection)
    there is no <person> here The following may be negative examples of authority objections:
    we are not the right company
    we are having an internal meeting to decide whether to buy A need objection may indicate that the pitched product/service lacks something or that the product/service is already fulfilled. A need objection may leave open the possibility for the salesperson to better communicate the feature and/or offer a different product or service that might be a better fit. The following may be positive examples of need objections:
    <product> doesn't work for me
    no thanks, we are moving to <vendor>
    no thanks, we are happy with <vendor>
    not a good fit
    we are under contract with <vendors>
    I am no longer in the market for <product>
    these products are not for us
    your product lacks a key feature that we need The following may be negative examples of need objections:
    we are not interested
    we are all set
    no thanks A timing objection may indicate that while the customer is saying "no" to a sales offer right now, they might be interested at a later time. This objection may be distinct from a negative example like general scheduling (e.g., Friday doesn't work for me, try next week), where a sales offer is not being objected to specifically. The following may be positive examples of timing objections:
    not sure yet
    not interested right now
    decision has not yet been made
    not for us at the moment
    we will let you know if we change our minds in the future
    we are swamped this quarter
    won't be considering new venders until next quarter The following may be considered negative examples of objection messages:

I'm not available to attend the event, thanks so much for the invite!

next week isn't good for me. please reach back sometime after next week next week I'm gone. I'll reach out when I get back.

I'm on vacation. call me back next month

A not interested objection may indicate that the customer is done with this particular sales engagement, wishes it to end immediately, and leaves little room for interpretation, leaves little room to continue the sales conversation. A not interested objection may not include a request to stop future communications. The following may be considered positive examples of not interested objections:

not interested
not interested and take me off your list
not interested at this time
these types of products are not for us
I'm sorry, we are not interested
we have no interest in your product
not interested for now. will reach out if anything changes
thanks but no thanks
no thanks, we are happy with our current vendor The following may be considered negative examples of not interested objections:

talked with my team. they have no interested in the product

A do not contact objection may indicate that the customer is finished with a particular sales engagement, wishes it to end immediately, and leaves little room for interpretation. A do not contact objection may leave little room to continue the sales conversation. Such an objection may include a request to stop all future communications (e.g., cease and desist) including emails and calls. The following may be positive examples of do not contact objections:

please do not contact me
unsubscribe me
stop emailing me
take me off your list
stop spamming me
do not call me for the time being
do not call or email me As such, in some cases, a message may be classified in more than one category.

Figure 3:
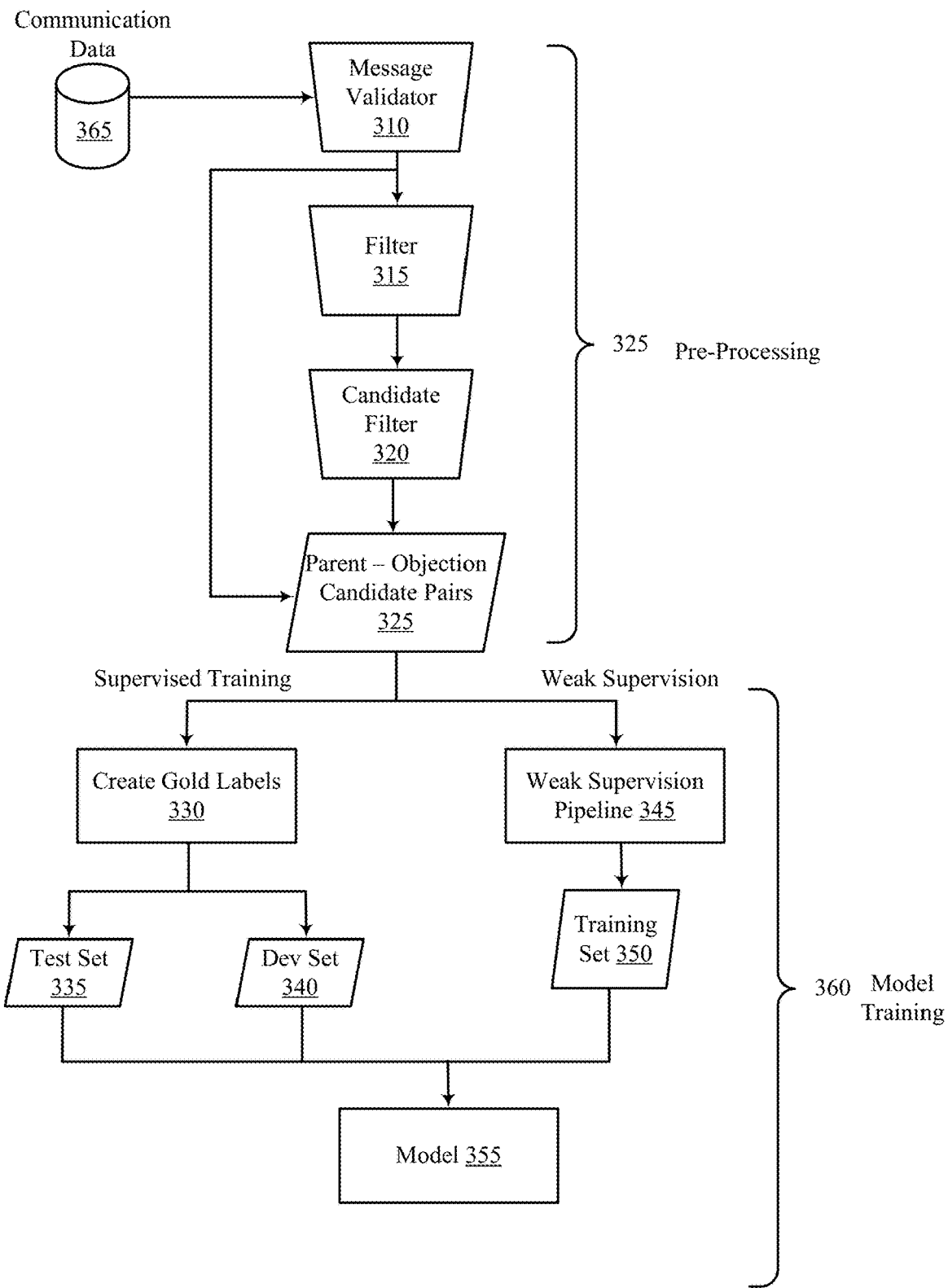
FIG. 3 illustrates an example of a model training system that supports message objection identification and handling in accordance with aspects of the present disclosure.

FIG. 3 illustrates an example of a model training system 300 that supports message objection identification and handling in accordance with aspects of the present disclosure. The model training system 300 may be used to train a model, such as model 235 of FIG. 2, for identifying objection messages based on new messages as well as parent messages of new messages that are identified as being objection candidates. The model training system 300 may be implemented by aspects of server 215 of FIG. 2, cloud platform 115 or data center 120 of FIG. 1, for example.

The model training system 300 includes a pre-processing pipeline 325, which may be used to filter messages from a corpus of communication data. The pre-processing pipeline 325 may be an example of the pre-processing component 250 of FIG. 2, and may apply many similar or the same pre-processing rules to message data to identify objection candidates. In some cases, the pre-processing pipeline 325 may be an offline component and may generate threads of messages for pre-processing. The pre-processing pipeline 325 may apply of set of heuristics to filter the message data and includes message validator 310 that accesses or receives a corpus of communication data 365, which may be an example of email data, chat message data, social media message data, telephonic transcript data, or a combination of these. The message validator 310 may identify composed, well-behaved messages, which may then be processed by a filter component 315. The filter component 315 may apply a rule to identify messages that are inbound from external sources. For example, the filter component 315 may compare user identifiers in the communication data 365 to a user repository corresponding to an organization. A candidate filter 320 may apply a rule that determines whether each message includes one or more of a pre-defined list of strings. The pre-processing pipeline 325 may function to reduce the amount of messages that are used to train the model in the model training pipeline 360, to provide a structured set of training data, etc.

The messages of the corpus of communication data 365 that pass the message validator, the filter component 315, and the candidate filter 320 may be identified as objection candidates. The system may then identify the parent messages of the objection message candidates to for objection-parent pairs. The set of objection-parent pairs include each objection candidate message and the corresponding parent message. The set of objection-parent may be used as the training data for training the model. The training data may be labeled using a supervised or a barely or weakly supervised technique. Labeling the data may include identifying whether an objection message of each objection-parent pair correspond to an objection message classification. In some examples, labeling the data includes identifying a classification of an objection message (e.g., one or more of six classifications) for each objection-parent pair.

In accordance with a supervised training process, a set of users may create a set of "gold" labels 330, which may represent the truth according to the set of users. The set of gold labeled data may be split into a test set 335 and a development set 340. The development set 340 may be used to initially train the model 355, and the test set 335 is tested against the model 355. In some examples, the output of test set 335 is used to adjust a loss function to further tune the model 355.

In accordance with a weakly supervised training process, a weak supervision pipeline component 345 may use probabilistic labeling in accordance with a generative model. In accordance with this process, the weak supervision pipeline component 345 may identify intermediate labels, which are used to train the model. In one example, a series of regular expressions (regexs) are applied to each objection-parent pair. Each regex may correspond to one or more of the categories of objection messages. If the regex pattern is identified in an objection-parent pair, then a value corresponding to the category for that objection-parent pair may be increased by some pre-determined value. If the regex pattern is not identified in an objection-parent pair, then the value corresponding to the category for that objection-parent pair may be decreased by some pre-determined value. After application of the set of regexs to the objection-parent pairs, then each objection-parent pair may be associated with a set of values corresponding to the categories of objections. The values may represent a probability that the objection-parent pair corresponds to a category. These values and corresponding pairs are fed into the model 355 for training as a training set 350, which may result in a trained, tuned, and characterized model. Other type of probabilistic training frameworks are contemplated.

Figure 4:
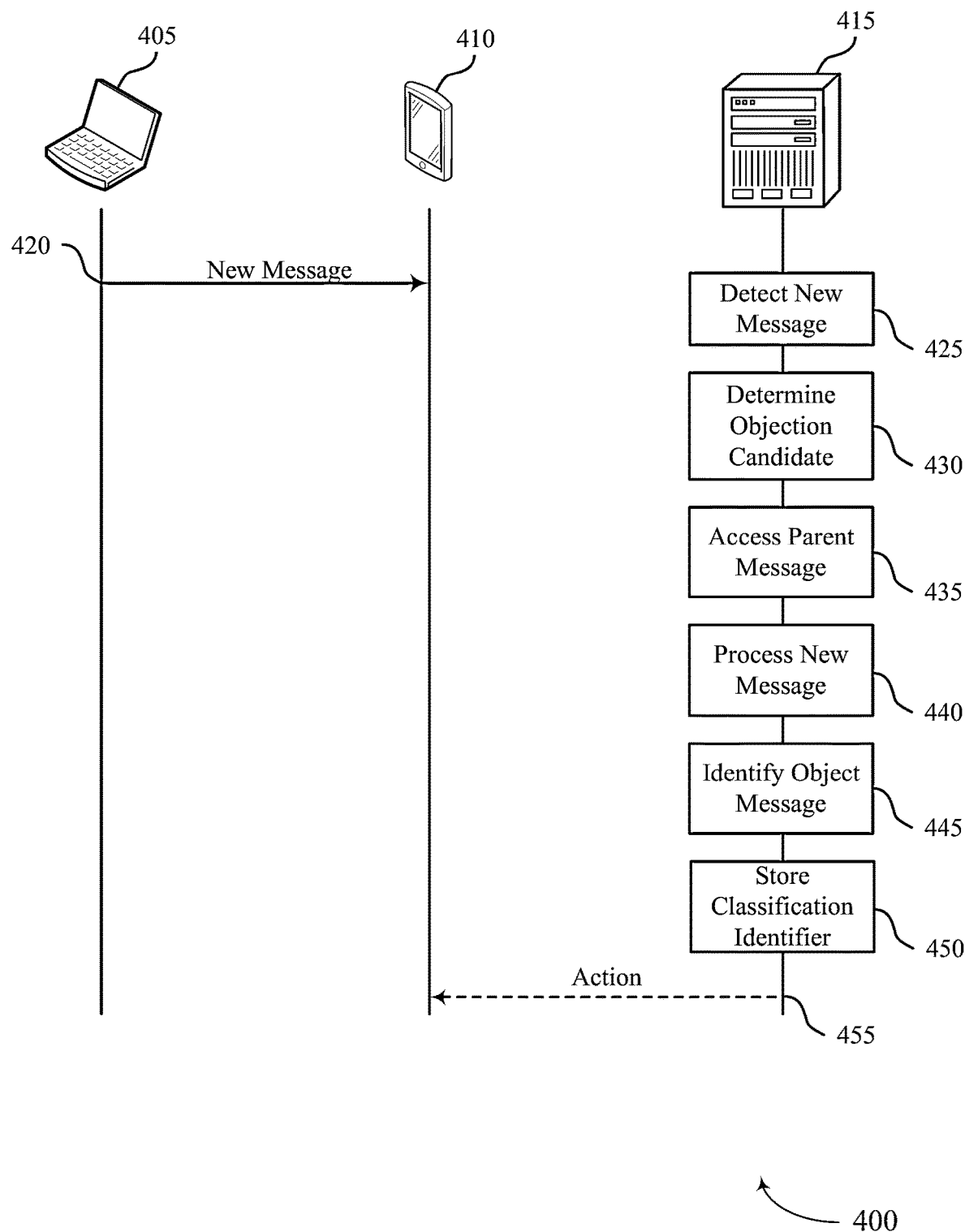
FIG. 4 illustrates an example of a process flow diagram that supports message objection identification and handling in accordance with aspects of the present disclosure.

FIG. 4 illustrates an example of a process flow diagram 400 that supports message objection identification and handling in accordance with aspects of the present disclosure. The process flow diagram 400 includes a user devices 405 and 410 and server 415. The user devices may be examples of the user devices 205 as described with respect to FIG. 2, and the server 420 may be an example of the server 215 as described with respect to FIG. 2.

At 420, a first user associated with the user device 410 receives a message (e.g., new message) from a second user associated with user device 405. The message may be an example of an email, a text message, a social media post, a chat application message, or the like.

At 425, the server 415 may detect, using a data stream connection, that the new message is transmitted to the first user associated with a first user identifier and by a second user associated with a second user identifier. The first and second user identifiers may be examples of email addresses, subscriber names, inferred identifiers, or the like.

At 430, the server 415 may determine that the new message is an objection candidate based at least in part on applying one or more pre-processing rules to the new message. The pre-processing rules may correspond to heuristics that function to avoid processing all messages, which reduces processing and memory overhead, and avoid identifying false positives. The pre-processing rules may determine whether the message is inbound, whether the message is well-behaved and composed, and/or whether the message includes one or more of a predefined set of strings.

At 435, the server 415 may access a parent message of the new message based at least in part on determining that the new message is the objection candidate. Accessing the parent message may include identifying, from a datastore storing a plurality of message threads, a message thread associated with the first user identifier and the second user identifier. The message thread representing a plurality of messages transmitted between the first user and the second user. The parent messages may function to provide additional context, which results in a more accurate objection message classification.

At 440, the server 415 may process the new message and the parent message using a machine learning model that is configured to classify objection messages. The model may be configured as such in accordance with the training of the model. In some cases, the model is a deep-learning model, which outputs a set of values corresponding to a set of objection message categories. Each value may represent a confidence score or probability that the objection message corresponds to one of the objection message categories.

At 450, the server 415 may store an objection classification identifier in association with the new message based at least in part on the identifying. In some cases, the storing may trigger or correspond to one or more actions that are identified based at least in part on objection message classification.

At 455, the server 455 may transmit an indication of one or more actions or trigger one or more actions at the user device 410. The action may include an indication, email generation or transmission, setting a reminder, etc.

Figure 5:
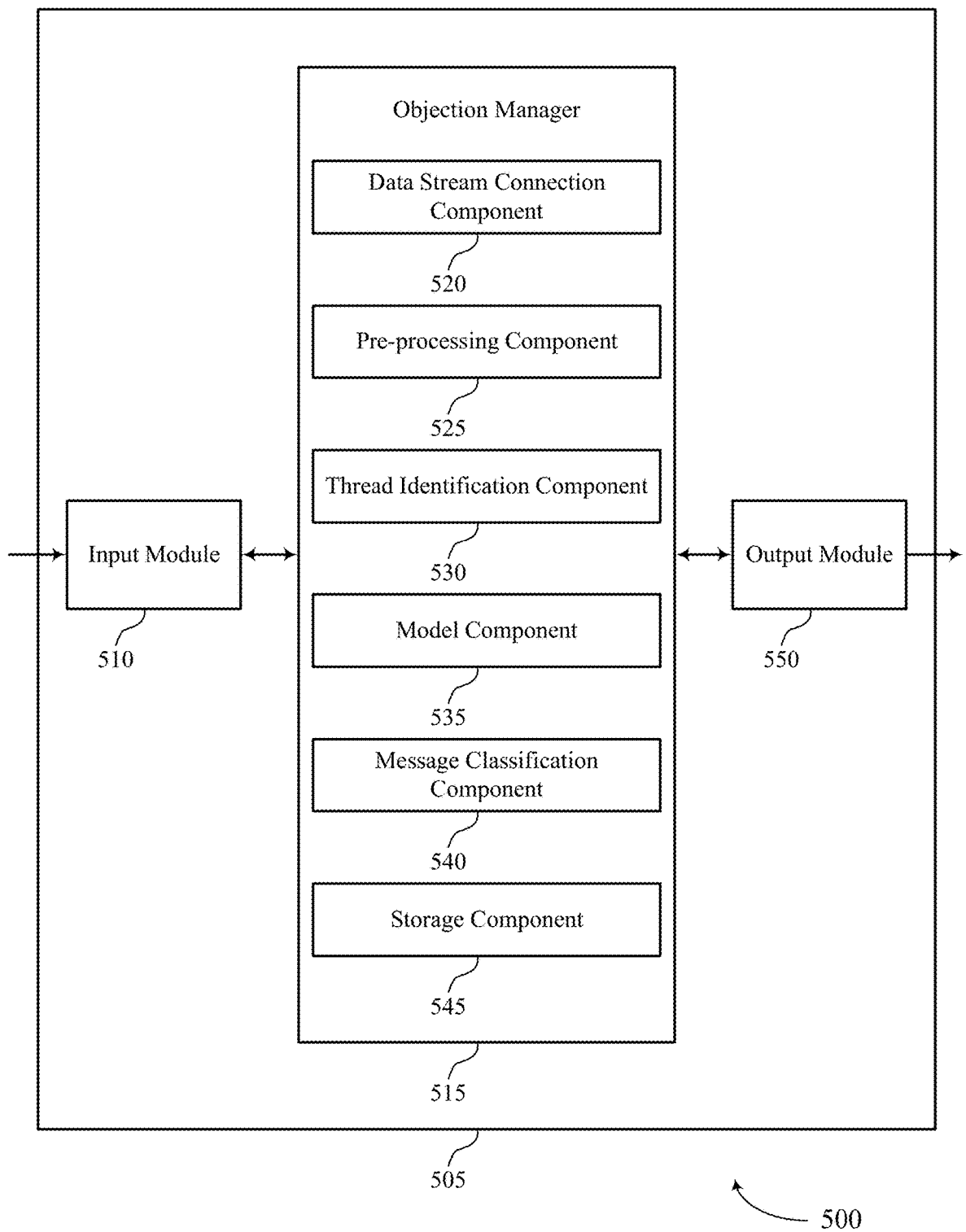
FIG. 5 shows a block diagram of an apparatus that supports message objection identification and handling in accordance with aspects of the present disclosure.

FIG. 5 shows a block diagram 500 of an apparatus 505 that supports message objection identification and handling in accordance with aspects of the present disclosure. The apparatus 505 may include an input module 510, an objection manager 515, and an output module 550. The apparatus 505 may also include a processor. Each of these components may be in communication with one another (e.g., via one or more buses). In some cases, the apparatus 505 may be an example of a user terminal, a database server, or a system containing multiple computing devices.

The input module 510 may manage input signals for the apparatus 505. For example, the input module 510 may identify input signals based on an interaction with a modem, a keyboard, a mouse, a touchscreen, or a similar device. These input signals may be associated with user input or processing at other components or devices. In some cases, the input module 510 may utilize an operating system such as iOS®, ANDROID®, MS-DOS®, MS-WINDOWS®, OS/2®, UNIX®, LINUX®, or another known operating system to handle input signals. The input module 510 may send aspects of these input signals to other components of the apparatus 505 for processing. For example, the input module 510 may transmit input signals to the objection manager 515 to support message objection identification and handling. In some cases, the input module 510 may be a component of an input/output (I/O) controller 715 as described with reference to FIG. 7.

The objection manager 515 may include a data stream connection component 520, a pre-processing component 525, a thread identification component 530, a model component 535, a message classification component 540, and a storage component 545. The objection manager 515 may be an example of aspects of the objection manager 605 or 710 described with reference to FIGS. 6 and 7.

The objection manager 515 and/or at least some of its various sub-components may be implemented in hardware, software executed by a processor, firmware, or any combination thereof. If implemented in software executed by a processor, the functions of the objection manager 515 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The objection manager 515 and/or at least some of its various sub-components may be physically located at various positions, including being distributed such that portions of functions are implemented at different physical locations by one or more physical devices. In some examples, the objection manager 515 and/or at least some of its various sub-components may be a separate and distinct component in accordance with various aspects of the present disclosure. In other examples, the objection manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The data stream connection component 520 may detect, using a data stream connection, that a new message is transmitted to a first user associated with a first user identifier and by a second user associated with a second user identifier. The pre-processing component 525 may determine that the new message is an objection candidate based on applying one or more pre-processing rules to the new message.

The thread identification component 530 may access a parent message of the new message based on determining that the new message is the objection candidate. The model component 535 may process the new message and the parent message using a machine learning model that is configured to classify objection messages.

The message classification component 540 may identify that the new message is classified as an objection message based on processing the new message and the parent message using the machine learning model. The storage component 545 may store an objection classification identifier in association with the new message based on the identifying.

The output module 550 may manage output signals for the apparatus 505. For example, the output module 550 may receive signals from other components of the apparatus 505, such as the objection manager 515, and may transmit these signals to other components or devices. In some specific examples, the output module 550 may transmit output signals for display in a user interface, for storage in a database or data store, for further processing at a server or server cluster, or for any other processes at any number of devices or systems. In some cases, the output module 550 may be a component of an I/O controller 715 as described with reference to FIG. 7.

Figure 6:
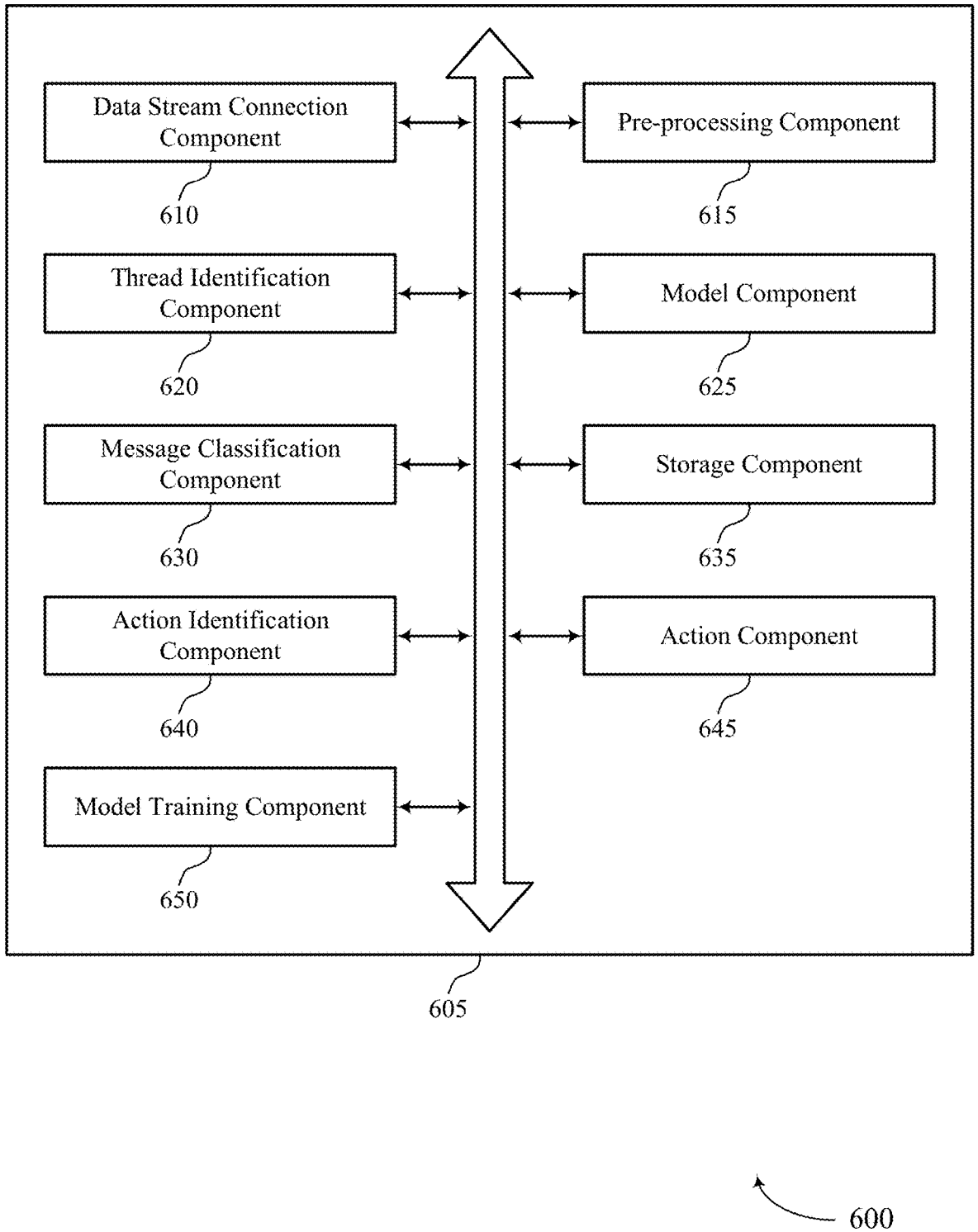
FIG. 6 shows a block diagram of an objection manager that supports message objection identification and handling in accordance with aspects of the present disclosure.

FIG. 6 shows a block diagram 600 of an objection manager 605 that supports message objection identification and handling in accordance with aspects of the present disclosure. The objection manager 605 may be an example of aspects of an objection manager 515 or an objection manager 710 described herein. The objection manager 605 may include a data stream connection component 610, a pre-processing component 615, a thread identification component 620, a model component 625, a message classification component 630, a storage component 635, an action identification component 640, an action component 645, and a model training component 650. Each of these modules may communicate, directly or indirectly, with one another (e.g., via one or more buses).

The data stream connection component 610 may detect, using a data stream connection, that a new message is transmitted to a first user associated with a first user identifier and by a second user associated with a second user identifier.

The pre-processing component 615 may determine that the new message is an objection candidate based on applying one or more pre-processing rules to the new message. In some examples, the pre-processing component 615 may identify that the second user identifier is associated with an external source.

In some examples, the pre-processing component 615 may determine whether the new message includes a string from a predefined list of strings, where the predefined list of strings are associated with objection messages. The thread identification component 620 may access a parent message of the new message based on determining that the new message is the objection candidate.

In some examples, the thread identification component 620 may identify, from a datastore storing a set of message threads, a message thread associated with the first user identifier and the second user identifier, the message thread representing a set of messages transmitted between the first user and the second user.

The model component 625 may process the new message and the parent message using a machine learning model that is configured to classify objection messages.

In some examples, the model component 625 may generate, by the machine learning model, a confidence score corresponding to each of a set of objection message categories. In some examples, the model component 625 may featurize the new message and the parent message in accordance with the machine learning model, where the new message classified as the objection message based on the featurized new message and parent message.

The message classification component 630 may identify that the new message is classified as an objection message based on processing the new message and the parent message using the machine learning model. In some examples, the message classification component 630 may identify that the new message corresponds to one or more of the set of objection message categories based on the confidence score corresponding to each of the set of objection message categories.

The storage component 635 may store an objection classification identifier in association with the new message based on the identifying. The action identification component 640 may identify one or more actions based on identifying that the new message is classified as the objection message.

In some examples, the action identification component 640 may transmit an indication of the one or more actions to a client system associated with the first user identifier based on identifying the one or more actions. The action component 645 may perform the one or more actions based on identifying the one or more actions.

In some examples, performing the one or more actions includes transmitting an email, generating an email for the first user identifier, identifying data, removing the second user identifier from a list of user identifiers, or a combination thereof. The model training component 650 may generate a set of training data for the machine learning model by.

In some examples, the model training component 650 may pre-process a corpus of message data using the one or more pre-processing rules to identify a set of objection candidate messages.

In some examples, the model training component 650 may access the parent message for each objection candidate message of the set of objection candidate messages. In some examples, the model training component 650 may generate the set of training data including a set of objection-parent pairs including each objection candidate message and the corresponding parent message.

In some examples, the model training component 650 may identify a label for each objection-parent pair of the set of objection-parent pairs, where the label indicates whether the objection-parent pair indicates that that the objection candidate message of the objection-parent pair corresponds to the objection message classification.

In some cases, the label includes a probabilistic label identified using a generative model.

Figure 7:
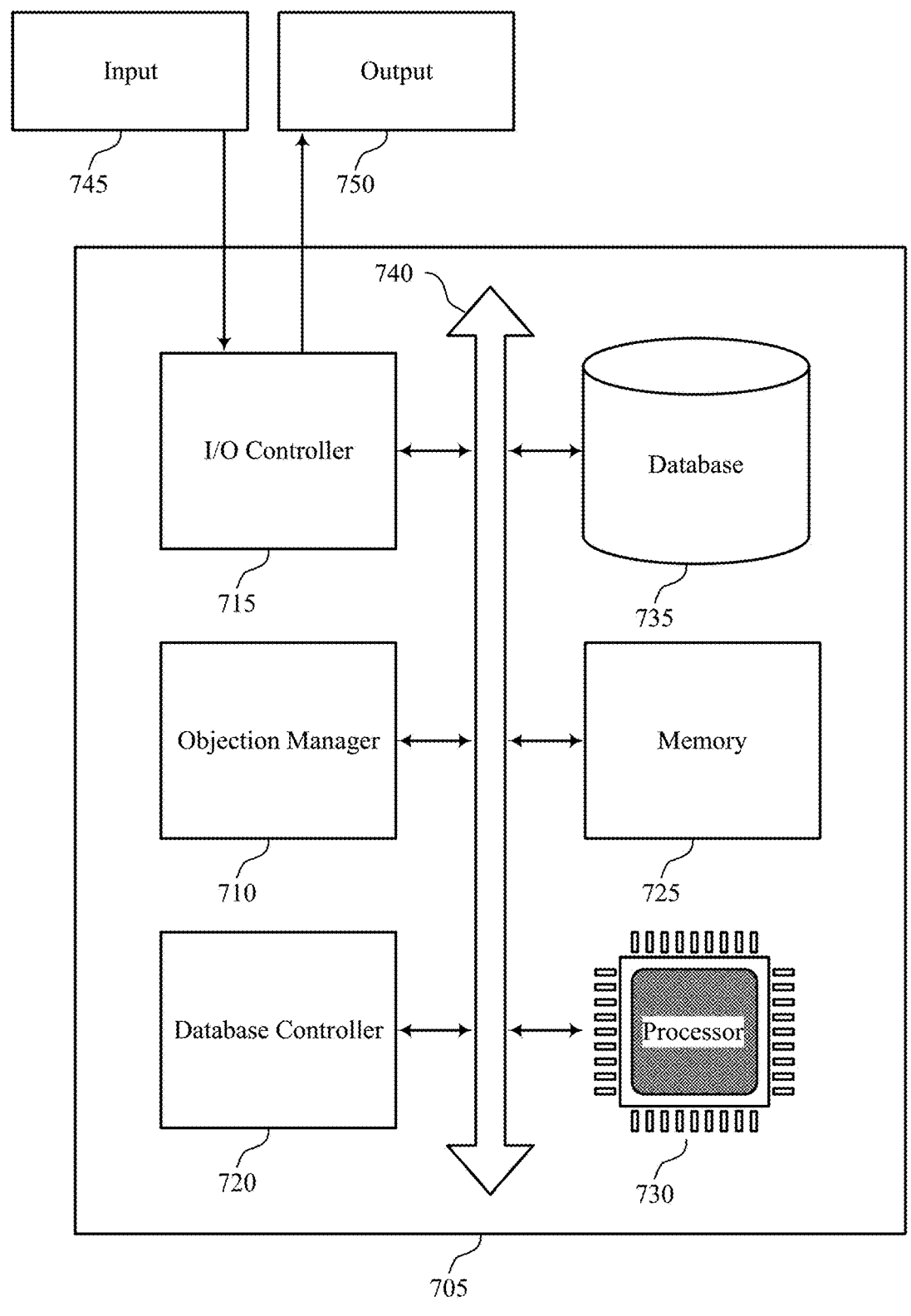
FIG. 7 shows a diagram of a system including a device that supports message objection identification and handling in accordance with aspects of the present disclosure.

FIG. 7 shows a diagram of a system 700 including a device 705 that supports message objection identification and handling in accordance with aspects of the present disclosure. The device 705 may be an example of or include the components of an analytical data store or an apparatus 505 as described herein. The device 705 may include components for bi-directional data communications including components for transmitting and receiving communications, including an objection manager 710, an I/O controller 715, a database controller 720, memory 725, a processor 730, and a database 735. These components may be in electronic communication via one or more buses (e.g., bus 740).

The objection manager 710 may be an example of an objection manager 515 or 605 as described herein. For example, the objection manager 710 may perform any of the methods or processes described above with reference to FIGS. 5 and 6. In some cases, the objection manager 710 may be implemented in hardware, software executed by a processor, firmware, or any combination thereof.

The I/O controller 715 may manage input signals 745 and output signals 750 for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The database controller 720 may manage data storage and processing in a database 735. In some cases, a user may interact with the database controller 720. In other cases, the database controller 720 may operate automatically without user interaction. The database 735 may be an example of a single database, a distributed database, multiple distributed databases, a data store, a data lake, or an emergency backup database.

Memory 725 may include random-access memory (RAM) and read-only memory (ROM). The memory 725 may store computer-readable, computer-executable software including instructions that, when executed, cause the processor to perform various functions described herein. In some cases, the memory 725 may contain, among other things, a basic input/output system (BIOS) which may control basic hardware or software operation such as the interaction with peripheral components or devices.

The processor 730 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 730 may be configured to operate a memory array using a memory controller. In other cases, a memory controller may be integrated into the processor 730. The processor 730 may be configured to execute computer-readable instructions stored in a memory 725 to perform various functions (e.g., functions or tasks supporting message objection identification and handling).

Figure 8:
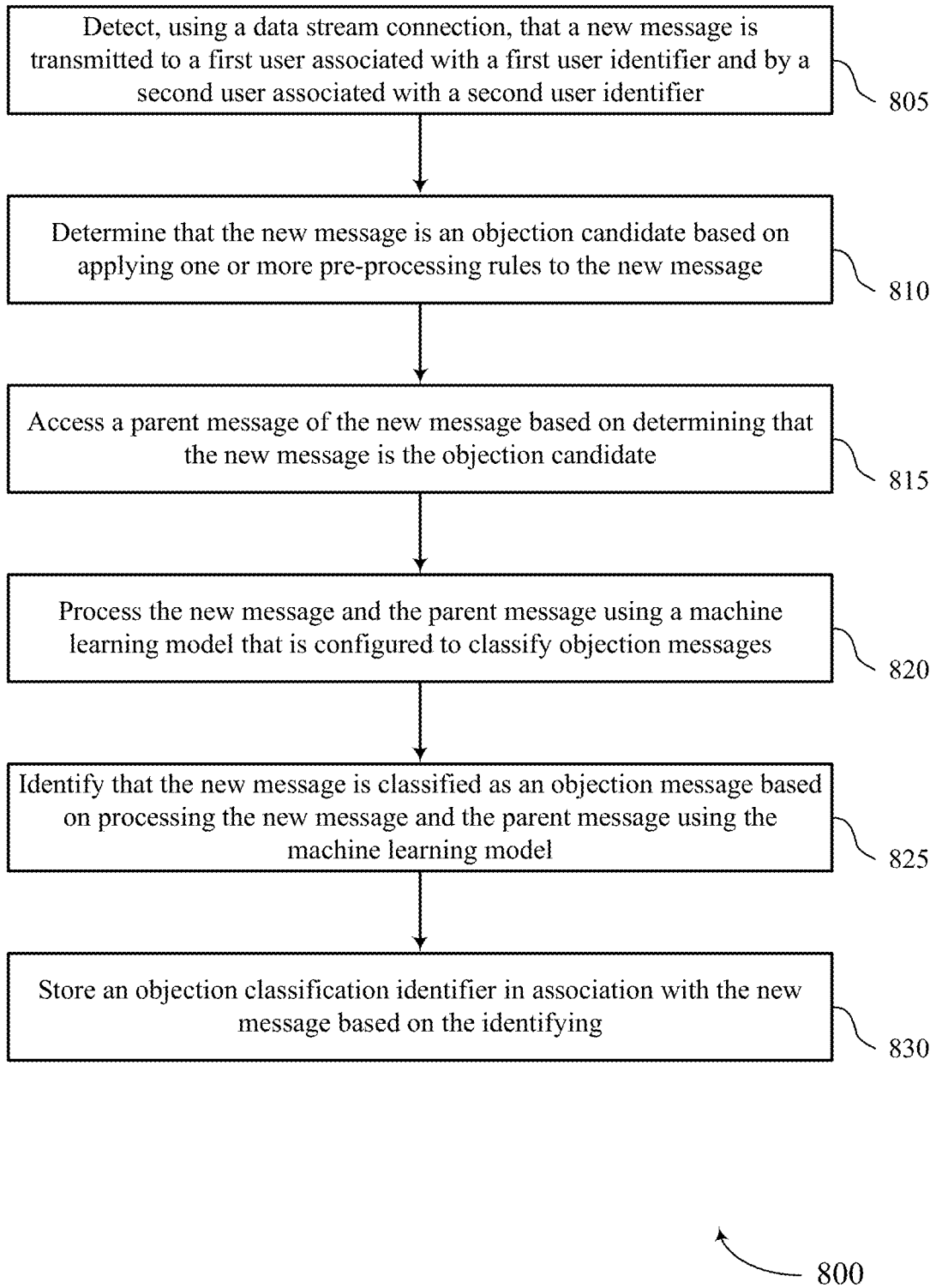
FIGS. 8 through 11 show flowcharts illustrating methods that support message objection identification and handling in accordance with aspects of the present disclosure.

FIG. 8 shows a flowchart illustrating a method 800 that supports message objection identification and handling in accordance with aspects of the present disclosure. The operations of method 800 may be implemented by an analytical data store or its components as described herein. For example, the operations of method 800 may be performed by an objection manager as described with reference to FIGS. 5 through 7. In some examples, an analytical data store may execute a set of instructions to control the functional elements of the analytical data store to perform the functions described below. Additionally or alternatively, an analytical data store may perform aspects of the functions described below using special-purpose hardware.

At 805, the analytical data store may detect, using a data stream connection, that a new message is transmitted to a first user associated with a first user identifier and by a second user associated with a second user identifier. The operations of 805 may be performed according to the methods described herein. In some examples, aspects of the operations of 805 may be performed by a data stream connection component as described with reference to FIGS. 5 through 7.

At 810, the analytical data store may determine that the new message is an objection candidate based on applying one or more pre-processing rules to the new message. The operations of 810 may be performed according to the methods described herein. In some examples, aspects of the operations of 810 may be performed by a pre-processing component as described with reference to FIGS. 5 through 7.

At 815, the analytical data store may access a parent message of the new message based on determining that the new message is the objection candidate. The operations of 815 may be performed according to the methods described herein. In some examples, aspects of the operations of 815 may be performed by a thread identification component as described with reference to FIGS. 5 through 7.

At 820, the analytical data store may process the new message and the parent message using a machine learning model that is configured to classify objection messages. The operations of 820 may be performed according to the methods described herein. In some examples, aspects of the operations of 820 may be performed by a model component as described with reference to FIGS. 5 through 7.

At 825, the analytical data store may identify that the new message is classified as an objection message based on processing the new message and the parent message using the machine learning model. The operations of 825 may be performed according to the methods described herein. In some examples, aspects of the operations of 825 may be performed by a message classification component as described with reference to FIGS. 5 through 7.

At 830, the analytical data store may store an objection classification identifier in association with the new message based on the identifying. The operations of 830 may be performed according to the methods described herein. In some examples, aspects of the operations of 830 may be performed by a storage component as described with reference to FIGS. 5 through 7.

Figure 9:
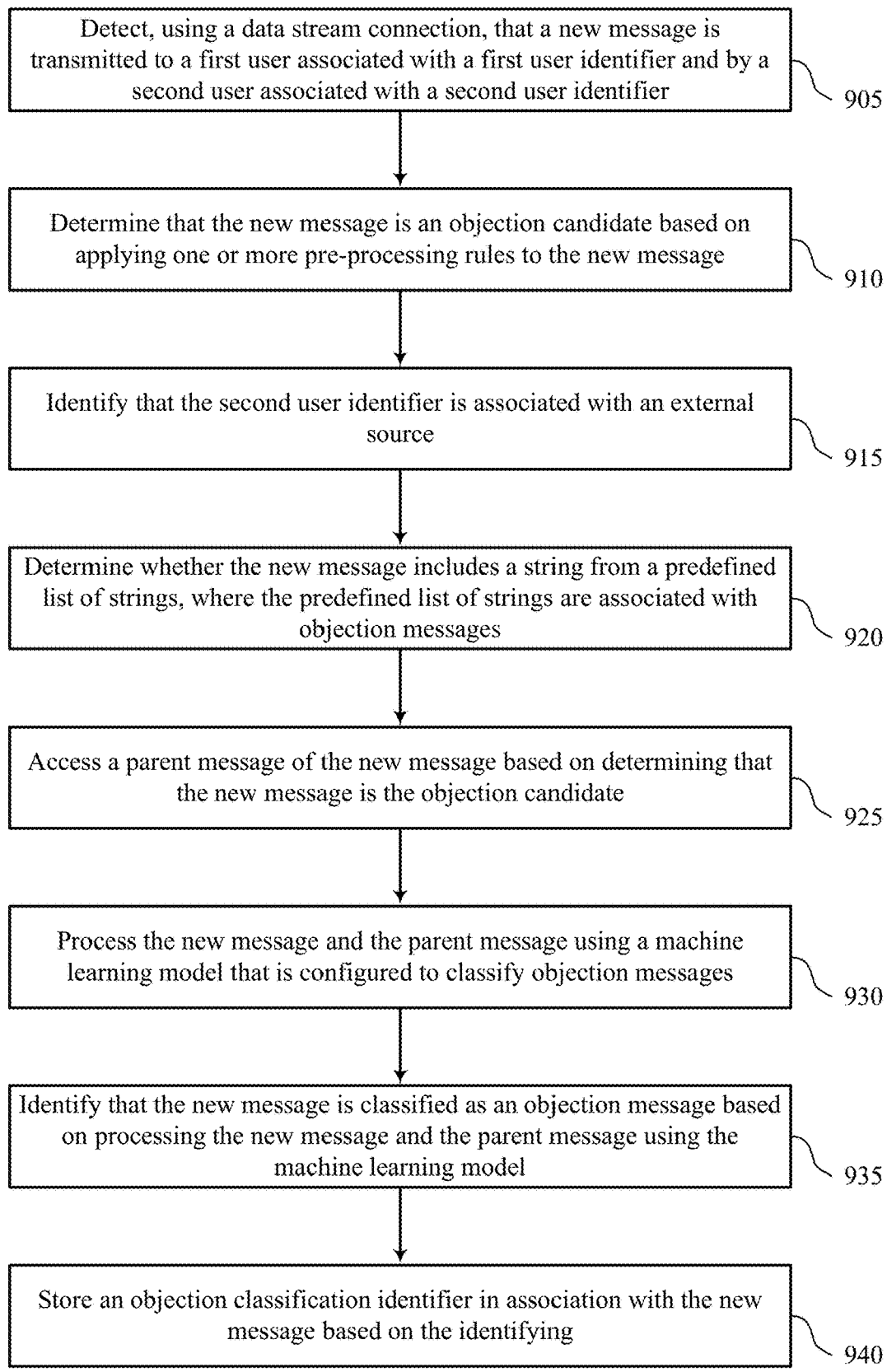

FIG. 9 shows a flowchart illustrating a method 900 that supports message objection identification and handling in accordance with aspects of the present disclosure. The operations of method 900 may be implemented by an analytical data store or its components as described herein. For example, the operations of method 900 may be performed by an objection manager as described with reference to FIGS. 5 through 7. In some examples, an analytical data store may execute a set of instructions to control the functional elements of the analytical data store to perform the functions described below. Additionally or alternatively, an analytical data store may perform aspects of the functions described below using special-purpose hardware.

At 905, the analytical data store may detect, using a data stream connection, that a new message is transmitted to a first user associated with a first user identifier and by a second user associated with a second user identifier. The operations of 905 may be performed according to the methods described herein. In some examples, aspects of the operations of 905 may be performed by a data stream connection component as described with reference to FIGS. 5 through 7.

At 910, the analytical data store may determine that the new message is an objection candidate based on applying one or more pre-processing rules to the new message. The operations of 910 may be performed according to the methods described herein. In some examples, aspects of the operations of 910 may be performed by a pre-processing component as described with reference to FIGS. 5 through 7.

At 915, the analytical data store may identify that the second user identifier is associated with an external source. The operations of 915 may be performed according to the methods described herein. In some examples, aspects of the operations of 915 may be performed by a pre-processing component as described with reference to FIGS. 5 through 7.

At 920, the analytical data store may determine whether the new message includes a string from a predefined list of strings, where the predefined list of strings are associated with objection messages. The operations of 920 may be performed according to the methods described herein. In some examples, aspects of the operations of 920 may be performed by a pre-processing component as described with reference to FIGS. 5 through 7.

At 925, the analytical data store may access a parent message of the new message based on determining that the new message is the objection candidate. The operations of 925 may be performed according to the methods described herein. In some examples, aspects of the operations of 925 may be performed by a thread identification component as described with reference to FIGS. 5 through 7.

At 930, the analytical data store may process the new message and the parent message using a machine learning model that is configured to classify objection messages. The operations of 930 may be performed according to the methods described herein. In some examples, aspects of the operations of 930 may be performed by a model component as described with reference to FIGS. 5 through 7.

At 935, the analytical data store may identify that the new message is classified as an objection message based on processing the new message and the parent message using the machine learning model. The operations of 935 may be performed according to the methods described herein. In some examples, aspects of the operations of 935 may be performed by a message classification component as described with reference to FIGS. 5 through 7.

At 940, the analytical data store may store an objection classification identifier in association with the new message based on the identifying. The operations of 940 may be performed according to the methods described herein. In some examples, aspects of the operations of 940 may be performed by a storage component as described with reference to FIGS. 5 through 7.

Figure 10:
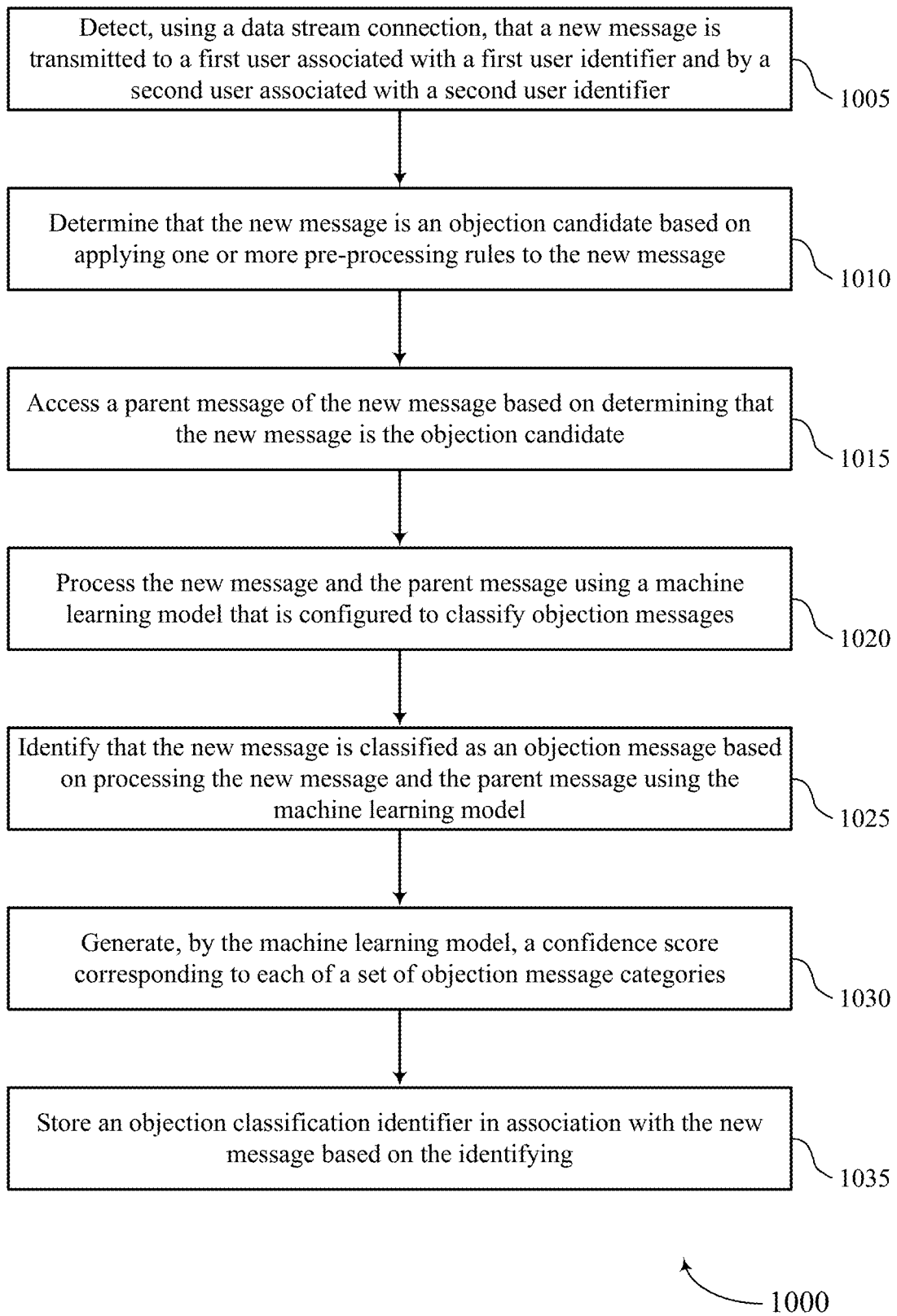

FIG. 10 shows a flowchart illustrating a method 1000 that supports message objection identification and handling in accordance with aspects of the present disclosure. The operations of method 1000 may be implemented by an analytical data store or its components as described herein. For example, the operations of method 1000 may be performed by an objection manager as described with reference to FIGS. 5 through 7. In some examples, an analytical data store may execute a set of instructions to control the functional elements of the analytical data store to perform the functions described below. Additionally or alternatively, an analytical data store may perform aspects of the functions described below using special-purpose hardware.

At 1005, the analytical data store may detect, using a data stream connection, that a new message is transmitted to a first user associated with a first user identifier and by a second user associated with a second user identifier. The operations of 1005 may be performed according to the methods described herein. In some examples, aspects of the operations of 1005 may be performed by a data stream connection component as described with reference to FIGS. 5 through 7.

At 1010, the analytical data store may determine that the new message is an objection candidate based on applying one or more pre-processing rules to the new message. The operations of 1010 may be performed according to the methods described herein. In some examples, aspects of the operations of 1010 may be performed by a pre-processing component as described with reference to FIGS. 5 through 7.

At 1015, the analytical data store may access a parent message of the new message based on determining that the new message is the objection candidate. The operations of 1015 may be performed according to the methods described herein. In some examples, aspects of the operations of 1015 may be performed by a thread identification component as described with reference to FIGS. 5 through 7.

At 1020, the analytical data store may process the new message and the parent message using a machine learning model that is configured to classify objection messages. The operations of 1020 may be performed according to the methods described herein. In some examples, aspects of the operations of 1020 may be performed by a model component as described with reference to FIGS. 5 through 7.

At 1025, the analytical data store may identify that the new message is classified as an objection message based on processing the new message and the parent message using the machine learning model. The operations of 1025 may be performed according to the methods described herein. In some examples, aspects of the operations of 1025 may be performed by a message classification component as described with reference to FIGS. 5 through 7.

At 1030, the analytical data store may generate, by the machine learning model, a confidence score corresponding to each of a set of objection message categories. The operations of 1030 may be performed according to the methods described herein. In some examples, aspects of the operations of 1030 may be performed by a model component as described with reference to FIGS. 5 through 7.

At 1035, the analytical data store may store an objection classification identifier in association with the new message based on the identifying. The operations of 1035 may be performed according to the methods described herein. In some examples, aspects of the operations of 1035 may be performed by a storage component as described with reference to FIGS. 5 through 7.

Figure 11:
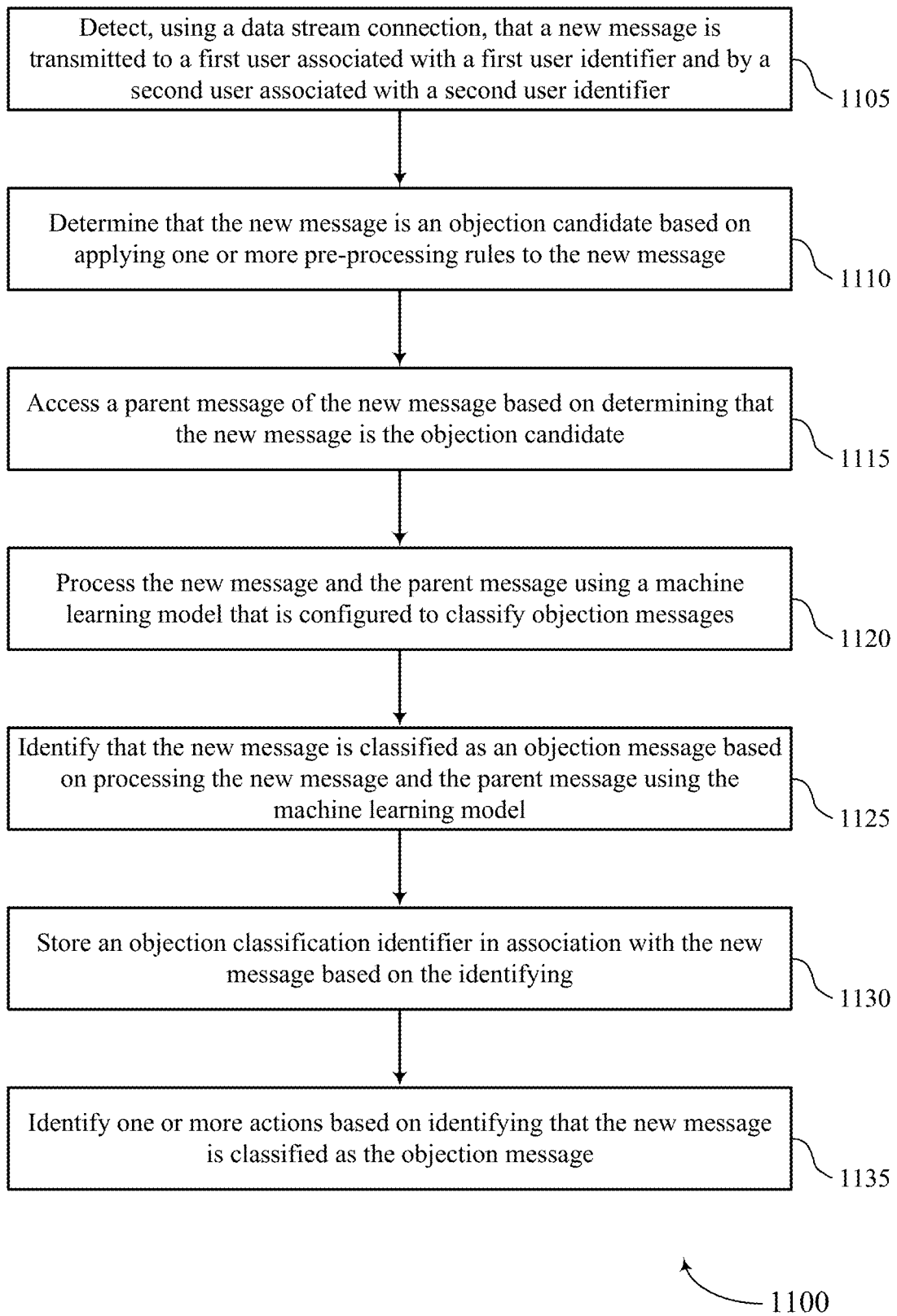

FIG. 11 shows a flowchart illustrating a method 1100 that supports message objection identification and handling in accordance with aspects of the present disclosure. The operations of method 1100 may be implemented by an analytical data store or its components as described herein. For example, the operations of method 1100 may be performed by an objection manager as described with reference to FIGS. 5 through 7. In some examples, an analytical data store may execute a set of instructions to control the functional elements of the analytical data store to perform the functions described below. Additionally or alternatively, an analytical data store may perform aspects of the functions described below using special-purpose hardware.

At 1105, the analytical data store may detect, using a data stream connection, that a new message is transmitted to a first user associated with a first user identifier and by a second user associated with a second user identifier. The operations of 1105 may be performed according to the methods described herein. In some examples, aspects of the operations of 1105 may be performed by a data stream connection component as described with reference to FIGS. 5 through 7.

At 1110, the analytical data store may determine that the new message is an objection candidate based on applying one or more pre-processing rules to the new message. The operations of 1110 may be performed according to the methods described herein. In some examples, aspects of the operations of 1110 may be performed by a pre-processing component as described with reference to FIGS. 5 through 7.

At 1115, the analytical data store may access a parent message of the new message based on determining that the new message is the objection candidate. The operations of 1115 may be performed according to the methods described herein. In some examples, aspects of the operations of 1115 may be performed by a thread identification component as described with reference to FIGS. 5 through 7.

At 1120, the analytical data store may process the new message and the parent message using a machine learning model that is configured to classify objection messages. The operations of 1120 may be performed according to the methods described herein. In some examples, aspects of the operations of 1120 may be performed by a model component as described with reference to FIGS. 5 through 7.

At 1125, the analytical data store may identify that the new message is classified as an objection message based on processing the new message and the parent message using the machine learning model. The operations of 1125 may be performed according to the methods described herein. In some examples, aspects of the operations of 1125 may be performed by a message classification component as described with reference to FIGS. 5 through 7.

At 1130, the analytical data store may store an objection classification identifier in association with the new message based on the identifying. The operations of 1130 may be performed according to the methods described herein. In some examples, aspects of the operations of 1130 may be performed by a storage component as described with reference to FIGS. 5 through 7.

At 1135, the analytical data store may identify one or more actions based on identifying that the new message is classified as the objection message. The operations of 1135 may be performed according to the methods described herein. In some examples, aspects of the operations of 1135 may be performed by an action identification component as described with reference to FIGS. 5 through 7.

A method of data processing is described. The method may include detecting, using a data stream connection, that a new message is transmitted to a first user associated with a first user identifier and by a second user associated with a second user identifier, determining that the new message is an objection candidate based on applying one or more pre-processing rules to the new message, accessing a parent message of the new message based on determining that the new message is the objection candidate, processing the new message and the parent message using a machine learning model that is configured to classify objection messages, identifying that the new message is classified as an objection message based on processing the new message and the parent message using the machine learning model, and storing an objection classification identifier in association with the new message based on the identifying.

An apparatus for data processing is described. The apparatus may include a processor, memory coupled with the processor, and instructions stored in the memory. The instructions may be executable by the processor to cause the apparatus to detect, using a data stream connection, that a new message is transmitted to a first user associated with a first user identifier and by a second user associated with a second user identifier, determine that the new message is an objection candidate based on applying one or more pre-processing rules to the new message, access a parent message of the new message based on determining that the new message is the objection candidate, process the new message and the parent message using a machine learning model that is configured to classify objection messages, identify that the new message is classified as an objection message based on processing the new message and the parent message using the machine learning model, and store an objection classification identifier in association with the new message based on the identifying.

Another apparatus for data processing is described. The apparatus may include means for detecting, using a data stream connection, that a new message is transmitted to a first user associated with a first user identifier and by a second user associated with a second user identifier, determining that the new message is an objection candidate based on applying one or more pre-processing rules to the new message, accessing a parent message of the new message based on determining that the new message is the objection candidate, processing the new message and the parent message using a machine learning model that is configured to classify objection messages, identifying that the new message is classified as an objection message based on processing the new message and the parent message using the machine learning model, and storing an objection classification identifier in association with the new message based on the identifying.

A non-transitory computer-readable medium storing code for data processing is described. The code may include instructions executable by a processor to detect, using a data stream connection, that a new message is transmitted to a first user associated with a first user identifier and by a second user associated with a second user identifier, determine that the new message is an objection candidate based on applying one or more pre-processing rules to the new message, access a parent message of the new message based on determining that the new message is the objection candidate, process the new message and the parent message using a machine learning model that is configured to classify objection messages, identify that the new message is classified as an objection message based on processing the new message and the parent message using the machine learning model, and store an objection classification identifier in association with the new message based on the identifying.

In some examples of the method, apparatuses, and non-transitory computer-readable medium described herein, applying the one or more pre-processing rules may include operations, features, means, or instructions for identifying that the second user identifier may be associated with an external source.

In some examples of the method, apparatuses, and non-transitory computer-readable medium described herein, applying the one or more pre-processing rules may include operations, features, means, or instructions for determining whether the new message includes a string from a predefined list of strings, where the predefined list of strings may be associated with objection messages.

In some examples of the method, apparatuses, and non-transitory computer-readable medium described herein, identifying that the new message may be classified as the objection message may include operations, features, means, or instructions for generating, by the machine learning model, a confidence score corresponding to each of a set of objection message categories.

Some examples of the method, apparatuses, and non-transitory computer-readable medium described herein may further include operations, features, means, or instructions for identifying that the new message corresponds to one or more of the set of objection message categories based on the confidence score corresponding to each of the set of objection message categories.

Some examples of the method, apparatuses, and non-transitory computer-readable medium described herein may further include operations, features, means, or instructions for identifying one or more actions based on identifying that the new message may be classified as the objection message.

Some examples of the method, apparatuses, and non-transitory computer-readable medium described herein may further include operations, features, means, or instructions for transmitting an indication of the one or more actions to a client system associated with the first user identifier based on identifying the one or more actions.

Some examples of the method, apparatuses, and non-transitory computer-readable medium described herein may further include operations, features, means, or instructions for performing the one or more actions based on identifying the one or more actions.

Some examples of the method, apparatuses, and non-transitory computer-readable medium described herein may further include operations, features, means, or instructions for performing the one or more actions includes transmitting an email, generating an email for the first user identifier, identifying data, removing the second user identifier from a list of user identifiers, or a combination thereof.

In some examples of the method, apparatuses, and non-transitory computer-readable medium described herein, processing the new message and the parent message using the machine learning model may include operations, features, means, or instructions for featurizing the new message and the parent message in accordance with the machine learning model, where the new message classified as the objection message based on the featurized new message and parent message.

Some examples of the method, apparatuses, and non-transitory computer-readable medium described herein may further include operations, features, means, or instructions for generating a set of training data for the machine learning model by, pre-processing a corpus of message data using the one or more pre-processing rules to identify a set of objection candidate messages, accessing the parent message for each objection candidate message of the set of objection candidate messages, and generating the set of training data including a set of objection-parent pairs including each objection candidate message and the corresponding parent message.

Some examples of the method, apparatuses, and non-transitory computer-readable medium described herein may further include operations, features, means, or instructions for identifying a label for each objection-parent pair of the set of objection-parent pairs, where the label indicates whether the objection-parent pair indicates that that the objection candidate message of the objection-parent pair corresponds to the objection message classification.

In some examples of the method, apparatuses, and non-transitory computer-readable medium described herein, the label includes a probabilistic label identified using a generative model.

Some examples of the method, apparatuses, and non-transitory computer-readable medium described herein may further include operations, features, means, or instructions for identifying, from a datastore storing a set of message threads, a message thread associated with the first user identifier and the second user identifier, the message thread representing a set of messages transmitted between the first user and the second user.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing, comprising:
   detecting, using a data stream connection, that a new message is transmitted to a first user associated with a first user identifier and by a second user associated with a second user identifier;
   determining that the new message is an objection candidate based at least in part on applying one or more pre-processing rules to the new message;
   accessing a parent message of the new message based at least in part on determining that the new message is the objection candidate;
   processing the new message and the parent message using a machine learning model that is configured to classify objection messages into one or more of a set of pre-configured types of objections;
   identifying that the new message is classified as an objection message based at least in part on processing the new message and the parent message using the machine learning model, wherein an objection message classification associated with the new message indicates a type of objection of the set of preconfigured types of objections and an action associated with the new message; and
   storing an objection classification identifier in association with the new message based at least in part on the identifying, the objection classification identifier corresponding to the type of objection and the action.

2. The method of claim 1, wherein applying the one or more pre-processing rules comprises:
   identifying that the second user identifier is associated with an external source.

3. The method of claim 1, wherein applying the one or more pre-processing rules comprises:
   determining whether the new message includes a string from a predefined list of strings, wherein the predefined list of strings are associated with the objection messages.

4. The method of claim 1, wherein identifying that the new message is classified as the objection message comprises:
   generating, by the machine learning model, a confidence score corresponding to each of a plurality of objection message categories.

5. The method of claim 4, further comprising:
   identifying that the new message corresponds to one or more of the plurality of objection message categories based at least in part on the confidence score corresponding to each of the plurality of objection message categories.

6. The method of claim 1, further comprising:
   identifying one or more actions based at least in part on identifying that the new message is classified as the objection message.

7. The method of claim 6, further comprising:
   transmitting an indication of the one or more actions to a client system associated with the first user identifier based at least in part on identifying the one or more actions.

8. The method of claim 6, further comprising:
   performing the one or more actions based at least in part on identifying the one or more actions.

9. The method of claim 8, further comprising:
   performing the one or more actions comprises transmitting an email, generating an email for the first user identifier, identifying data, removing the second user identifier from a list of user identifiers, or a combination thereof.

10. The method of claim 1, wherein processing the new message and the parent message using the machine learning model comprises:
    featurizing the new message and the parent message in accordance with the machine learning model, wherein the new message classified as the objection message based at least in part on the featurized new message and the parent message.

11. The method of claim 1, further comprising:
    generating a set of training data for the machine learning model by:
    pre-processing a corpus of message data using the one or more pre-processing rules to identify a set of objection candidate messages;
    accessing the parent message for each objection candidate message of the set of objection candidate messages; and generating the set of training data including a set of objection-parent pairs comprising each objection candidate message and a corresponding parent message.

12. The method of claim 11, further comprising: identifying a label for each objection-parent pair of the set of objection-parent pairs, wherein the label indicates whether an objection-parent pair indicates that an objection candidate message of the objection-parent pair corresponds to the objection message classification.

13. The method of claim 12, wherein the label comprises a probabilistic label identified using a generative model.

14. The method of claim 1, wherein: identifying, from a datastore storing a plurality of message threads, a message thread associated with the first user identifier and the second user identifier, the message thread representing a plurality of messages transmitted between the first user and the second user.

15. An apparatus for data processing, comprising:
a processor,
memory coupled with the processor; and
instructions stored in the memory and executable by the processor to cause the apparatus to:
detect, using a data stream connection, that a new message is transmitted to a first user associated with a first user identifier and by a second user associated with a second user identifier;
determine that the new message is an objection candidate based at least in part on applying one or more pre-processing rules to the new message;
access a parent message of the new message based at least in part on determining that the new message is the objection candidate;
process the new message and the parent message using a machine learning model that is configured to classify objection messages into one or more of a set of pre-configured types of objections;
identify that the new message is classified as an objection message based at least in part on processing the new message and the parent message using the machine learning model, wherein an objection message classification associated with the new message indicates a type of objection of the set of preconfigured types of objections and an action associated with the new message; and
store an objection classification identifier in association with the new message based at least in part on the identifying, the objection classification identifier corresponding to the type of objection and the action.

16. The apparatus of claim 15, wherein the instructions to apply the one or more pre-processing rules are executable by the processor to cause the apparatus to:
identify that the second user identifier is associated with an external source.

17. The apparatus of claim 15, wherein the instructions to apply the one or more pre-processing rules are executable by the processor to cause the apparatus to:
determine whether the new message includes a string from a predefined list of strings, wherein the predefined list of strings are associated with the objection messages.

18. The apparatus of claim 15, wherein the instructions to identify that the new message is classified as the objection message are executable by the processor to cause the apparatus to:
generate, by the machine learning model, a confidence score corresponding to each of a plurality of objection message categories.

19. A non-transitory computer-readable medium storing code for data processing, the code comprising instructions executable by a processor to:
detect, using a data stream connection, that a new message is transmitted to a first user associated with a first user identifier and by a second user associated with a second user identifier;
determine that the new message is an objection candidate based at least in part on applying one or more pre-processing rules to the new message;
access a parent message of the new message based at least in part on determining that the new message is the objection candidate;
process the new message and the parent message using a machine learning model that is configured to classify objection messages into one or more of a set of pre-configured types of objections;
identify that the new message is classified as an objection message based at least in part on processing the new message and the parent message using the machine learning model, wherein an objection message classification associated with the new message indicates a type of objection of the set of preconfigured types of objections and an action associated with the new message; and
store an objection classification identifier in association with the new message based at least in part on the identifying, the objection classification identifier corresponding to the type of objection and the action.

20. The non-transitory computer-readable medium of claim 19, wherein the instructions to apply the one or more pre-processing rules are executable to:
determine whether the new message includes a string from a predefined list of strings, wherein the predefined list of strings are associated with the objection messages.

21. The method of claim 1, wherein the type of objection comprises a do not contact objection, a not interested objection, a timing objection, a need objection, an authority objection, a budget objection, or any combination thereof.

22. The method of claim 6, wherein identifying the one or more actions comprises:
identifying the one or more actions based at least in part on identifying each type of objection of the set of preconfigured types of objections associated with the new message, wherein each type of objection is associated with the one or more actions.

* * * * *

UNITED STATES PATENT AND TRADEMARK OFFICE
CERTIFICATE OF CORRECTION

PATENT NO. : 11,681,948 B2
APPLICATION NO. : 16/777693
DATED : June 20, 2023
INVENTOR(S) : Asadorian et al.

It is certified that error appears in the above-identified patent and that said Letters Patent is hereby corrected as shown below:

On the Title Page

Line (71), Applicant:, delete "salesforce.com, inc." and add ---Salesforce, Inc.---

Signed and Sealed this
Twenty-fifth Day of July, 2023

Katherine Kelly Vidal
*Director of the United States Patent and Trademark Office*